(No Model.) 3 Sheets—Sheet 1.
O. REESER.
TESTING MACHINE.
No. 493,784. Patented Mar. 21, 1893.
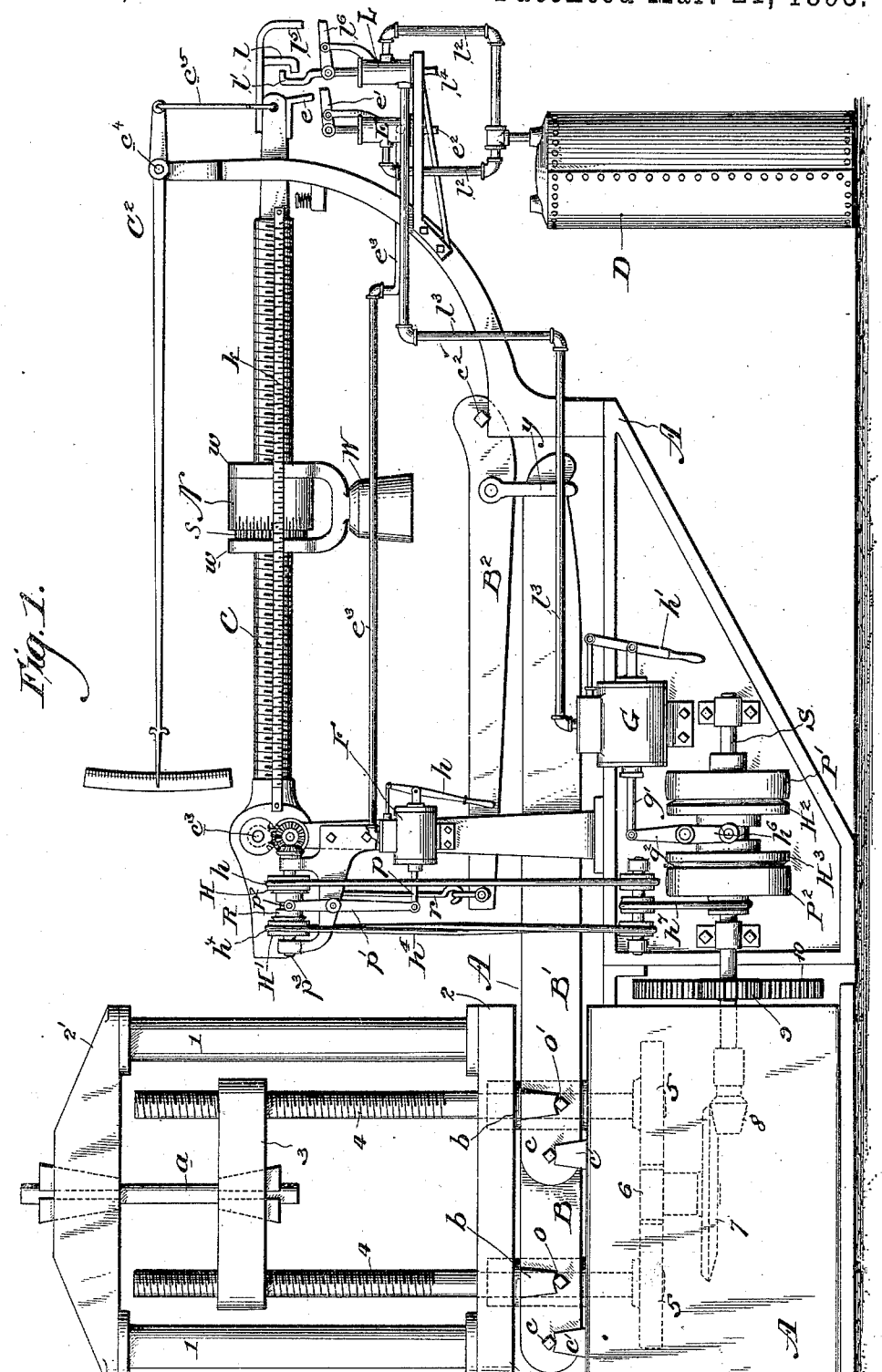

(No Model.) 3 Sheets—Sheet 2.
O. REESER.
TESTING MACHINE.
No. 493,784. Patented Mar. 21, 1893.
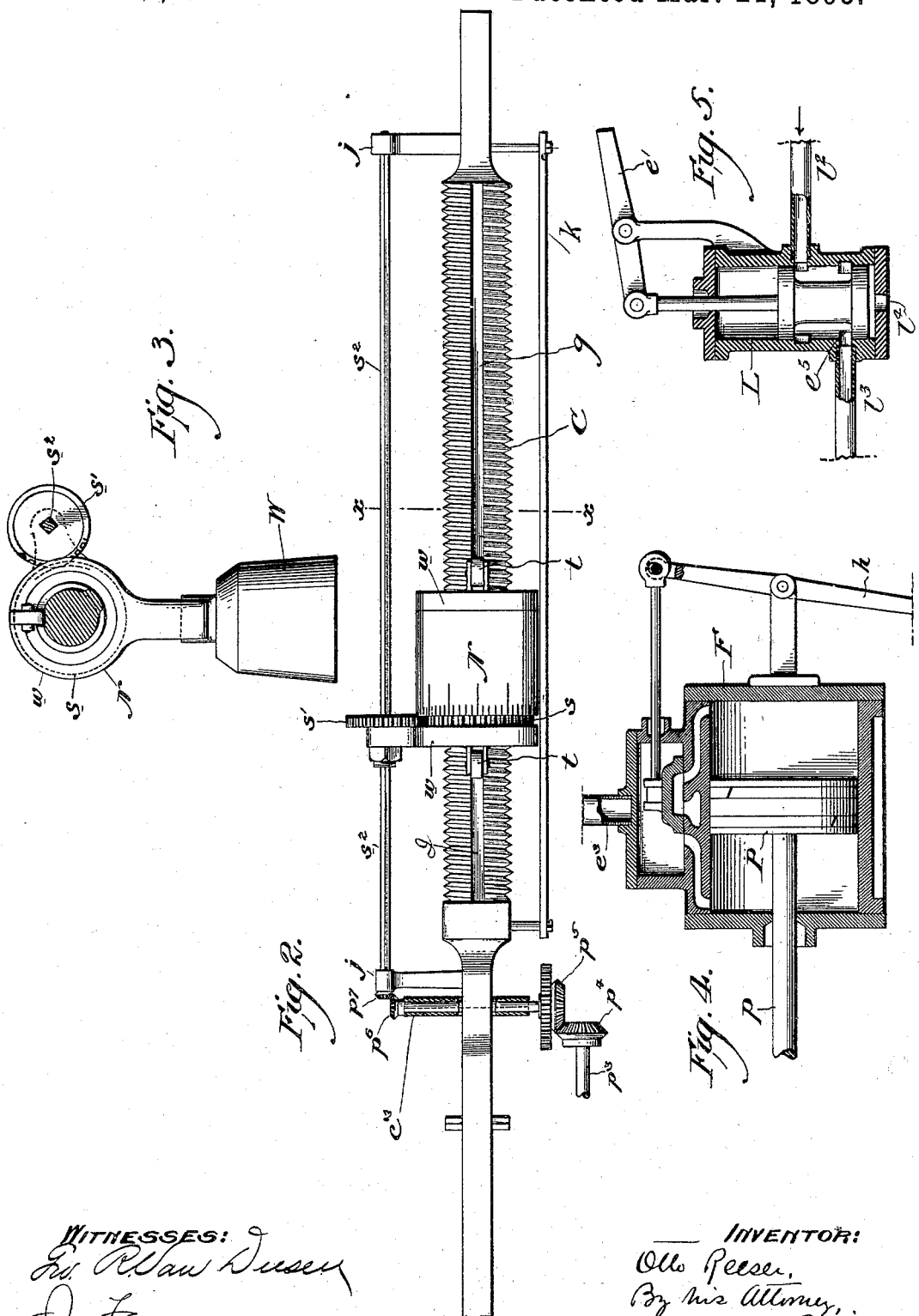
WITNESSES:
INVENTOR:
Otto Reeser,
By his Attorney,
Horace Pettit

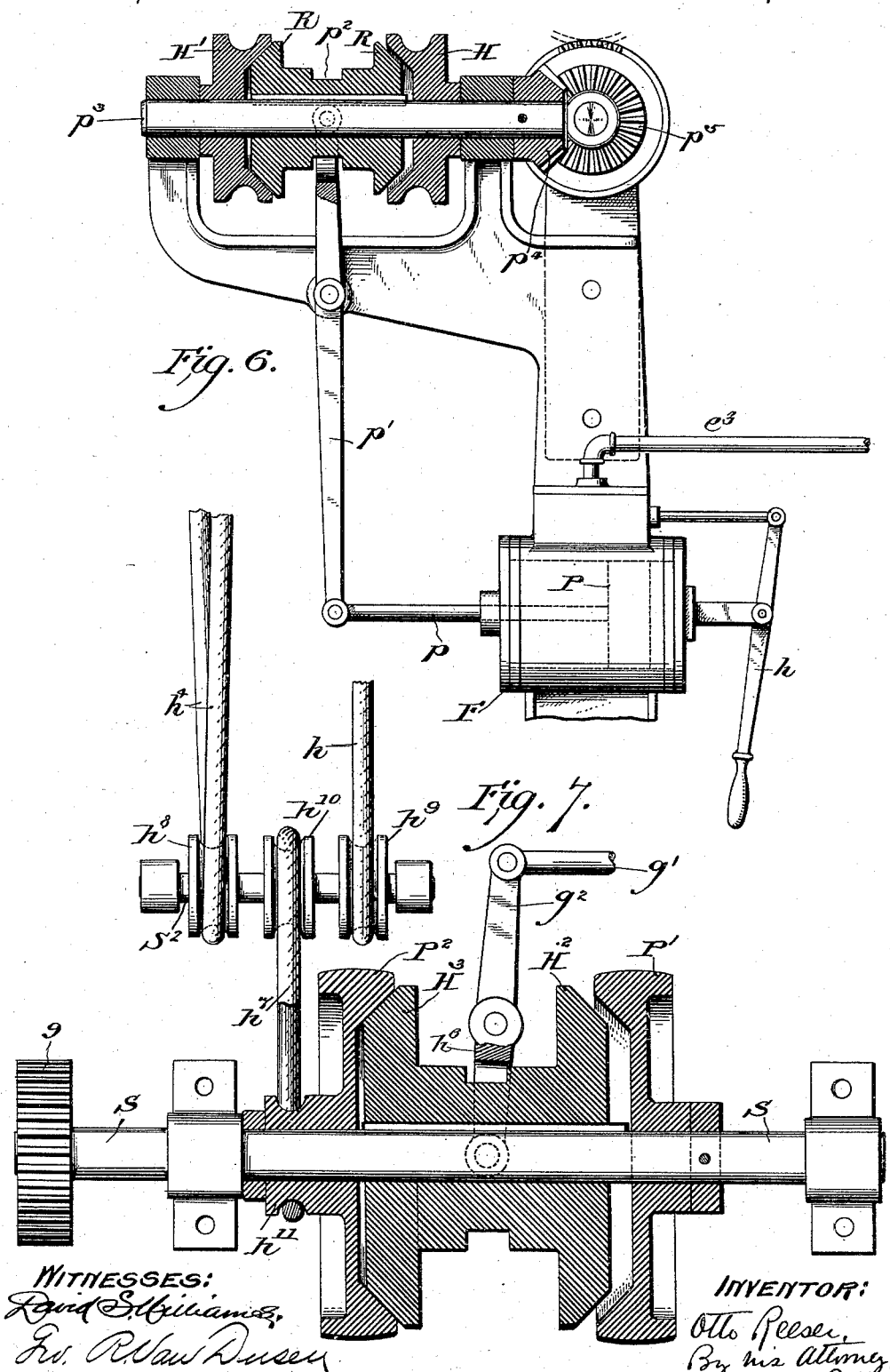

UNITED STATES PATENT OFFICE.

OTTO REESER, OF PHILADELPHIA, PENNSYLVANIA.

TESTING-MACHINE.

SPECIFICATION forming part of Letters Patent No. 493,784, dated March 21, 1893.

Application filed May 25, 1892. Serial No. 434,284. (No model.)

*To all whom it may concern:*

Be it known that I, OTTO REESER, of the city of Philadelphia and State of Pennsylvania, have invented a certain new and useful Improvement in Testing-Machines; and I do hereby declare the following to be a full, clear, and exact description thereof, reference being had to the accompanying drawings, forming part of this specification.
My invention has relation to machines for testing the strength of metal, and consists in the improvements hereinafter particularly described and claimed.

The object of my invention is to automatically regulate in a testing machine any increase or decrease of tension or compression applied to the specimen, to automatically register the result upon the beam and to laterally move the weighing poise by a nut rotated from power outside the machine.

I herein describe a specific construction of testing machine embodying my invention, other constructions, however, may be employed in carrying out my invention without departing from the spirit of the same.

I will now describe my invention so that others skilled in the art to which it appertains may make and use the same, reference being had to the accompanying drawings forming part of this specification, in which similar letters and numerals of reference refer to similar parts throughout.

Figure 1 is a side elevation of my improvement. Fig. 2 is a detached plan view showing in detail the weighing beam, the poise and the mechanism for operating the same. Fig. 3 is a cross section on the line $x$—$x$ of Fig. 2. Fig. 4 is a longitudinal section of the atmospherically operated piston and cylinder for throwing the friction disks in and out of gear. Fig. 5 is a sectional view of one of the mechanically operated valves constructed substantially similar to a second valve for a like purpose for admitting and cutting off the air supply leading to the atmospherically operated piston and cylinder. Fig. 6 is a partially sectional view of the gearing connecting with the weighing poise and its frictional disks automatically operated through the medium of the atmospheric cylinder and piston. Fig. 7 is a partially sectional view of the driving pulleys and their frictionally operated disks.

A represents the main frame and bearing upon which the operative portions of the device are mounted. Above and mounted upon the frame, A, to one side are uprights, 1, 1, connected above by a crosshead, 2', and below by a table, 2. The specimen, $a$, is secured rigidly in the crosshead, 2', at its upper end by wedges, or other suitable means, and at its lower end secured in a similar manner in a vertically adjustable crosshead, 3. Provided through the crosshead, 3 at either end are two vertically disposed screw-threaded rods, 4, 4, the screw-threads of which operate in the screw-threaded orifices provided in either end of the crosshead, 3, through which the said vertical rods pass; these vertical rods, 4, 4, are mechanically driven by any suitable gearing device, such as the gear wheels, 5, 5, 6 and the bevel gears, 7 and 8 which are driven through the medium of the gear wheels 9 and 10 from the main shaft, S.

As the vertical screw-threaded rods, 4, 4, are slowly operated at the same speed in the same direction, the threads of each being the same, the strain on the specimen, $a$, (which is here represented as being tested for its tensile strength) increases in the same increased proportion and the pressure of the bearings, $b$, $b$, which are rigidly affixed to the table, 2, is brought to bear upon the pivots, $o$, $o'$, which pivots, $o$, $o'$, are rigidly secured in a horizontal position upon the levers, B, B'; said levers rest on projecting supports, $c'$, $c'$, projecting from frame, A, by pivot edges, $c$, $c$. The levers, B, B', are connected at their ends by a yoke or link, $y$, to another lever, B², provided above the said levers, B, B', which is pivoted or fulcrumed upon the pivot or pin, $c^3$. The other end of the lever, B², is connected by a rod and link, $r$, the upper end of which is connected with the registering beam, C, to its short arm outside and beyond the bearing or fulcrum, $c^3$. The said levers, B, B', B², and beam, C, and their connections thus forming a compound lever or scale. An additional beam or pointer, C², is provided above the beam, C, pivoted at $c^4$, to more readily indicate through the medium of its connection, $c^5$, with the beam, C, any slight movement of the beam, C, by its point and dial. Any tensile strain or compression upon the specimen is thus communicated to the beam, C.

The object of my invention, as before stated, is to automatically regulate any increase or decrease of tension or compression applied to the specimen and to automatically regulate the weighing of the increased strain which I accomplish, as before stated, through the medium of compressed air or a vacuum controlled by evenly balanced valves, and to laterally move the weighing poise by a nut rotated by means of power communicated from without the machine proper. In order to accomplish this result I employ as a preferable construction in combination with the testing machine a screw-threaded cylindrical beam, C, having preferably a longitudinal guide or gutter, $g$, provided, as shown in Fig. 2, in the upper portion of the beam, C. Upon the beam, C, is provided a nut, N, internally screw-threaded and mounted to freely move on the threaded beam, C. A poise or weight, W, is provided on the beam, C, by the yoke, $w$, which passes freely around the beam, C, and is supported by the friction rollers, $t$, which operate longitudinally in the groove, $g$. The nut, N, is snugly provided between the arms of the yoke, $w$, of the poise, W, but yet so as to turn freely, and has on one end partially sunken serrations or a gearing, $s$, which are adapted to engage in the small gear wheel, $s'$, provided upon the angular longitudinal shaft, $s^2$, which shaft, $s^2$, has its bearings in the journals, $j, j$, secured rigidly to the beam, C. The wheel, $s'$, is keyed on the shaft, $s^2$ so as to slide upon the said shaft.

It is here noted before describing the other connecting portions of the mechanism that it is clear that as the wheel, $s'$, which is thus keyed upon the shaft, $s^2$, is rotated the nut, N, will also be rotated and will travel in one direction, or the other, according to the direction in which it is turned upon the beam, C, carrying with it the poise, W, which is adapted to register on the scale, $k$, provided rigidly on the beam, C, to one side and preferably graduated. The shaft, $s^2$, is driven from the main shaft, S, through the train of gear wheels and belting shown in the drawings, and specifically illustrated in Figs. 1 and 2. Thus while the tensile strength of the specimen, $a$, is being tested and the strain increases the train of gearing connecting with the shaft, $s^2$, will operate, as hereinafter described, and while the tendency of the outer end of the beam, C, by reason of the increased strain, will be upward the poise, W, will by the rotation of the shaft, $s^2$, nut, N, and the mechanism shown be advanced slowly in a direction toward the end of the beam, C, tending all the time to equalize the strain and balance the beam. When, however, the advance of the poise, W, is too rapid or is greater, proportionately than the increase of strain, the beam, C, will cease to occupy a neutral position and the outer end will descend, whereupon the projection, $e$, provided on the lower side of the outer end of the beam, C, will depress the fulcrumed lever, $e'$, and close the valve of the cylinder, E, thus cutting off the compressed air contained in the reservoir, D, which has previously been normally open and communicating through the connecting pipes, $e^3$, with the valve of the cylinder, F, which has previously been set in the position shown in Fig. 4 by the handle, $h$. The same movement of the lever, $e'$, will also open the exhaust pipe, $e^2$, of the cylinder, E. The escape of the compressed air from the cylinder F, will release the piston, P, and the piston rod, $p$, which is pivotally connected with the vertically pivoted arm, $p'$, which arm, $p'$, is connected by a clutch, $p^2$, with the frictional disk, R, keyed to the shaft, $p^3$. This will immediately release the frictional disk, R, from the pulley, H′, which is driven from the shaft, S, through the medium of the intermediate belts, $h^4$, $h^7$, and has been previously operating the keyed shaft, $s^2$, in the given direction heretofore described. The shaft, $S^2$, carries the pulleys, $h^8$, $h^9$, $h^{10}$, and is driven from the shaft, S, by the belt, $h^7$, operating in the pulleys, $h^{10}$, $h^{11}$. The beam, C, as the strain again increases will rise and the piston of the valve, E, falling of its own weight will open the ports of the valve, E, and allow the compressed air to flow again into the cylinder, F, and will force the piston, P, back to its former position and again throw the mechanism operating the poise, W, into gear and the poise, W, will advance on the beam, C, and same operation will be repeated. If the strain increases too rapidly for the travel of the poise the beam, C, will rise above its neutral position, and the hooked projection, $l$, will then engage the hooked end of the piston rod, $l'$, connected with the valve within the cylinder, L, and thus close the port (see Fig. 5) which has heretofore allowed the compressed air from the reservoir, D, to enter the cylinder, G, through the pipes, $l^2$, $l^4$, the same motion of the piston rod, $l'$, will also open the exhaust, $l^4$, and allow the compressed air in front of the piston head of the cylinder, G, to escape through the pipes, $l^3$ and out of the exhaust pipe $l^4$. The said piston being then released the piston rod, $g'$, will operate the pivotally connected lever, $g^2$, which is connected by clutch arms, $h^6$, with the friction disks, $H^2$, $H^3$, and will immediately release the disk, $H^2$, from the pulley, P′, and the vertical rods, 4, 4, operated thereby ceasing to operate the strain on the specimen and on the beam will not increase but the poise, W, will continue to travel.

When it is desired after the test to elevate the cross-head, or adjust it for another specimen, the valve of the cylinder, G, which is similar in construction to the valve shown in Fig. 4, is operated by the hand lever, $h'$, to the opposite position to that shown in Fig. 4, and when the port of the valve, L, is again open the compressed air entering on the opposite side of the piston in the cylinder, G, the disk, $H^2$, will be thrown into gear with the pulley, P′, operating in an opposite direction by a crossed belt, the screw-threaded rods, 4, 4, will be driven in an opposite direction and the crosshead, 3, forced up. In the same manner when it is desired to return the poise, W, on the beam, C, as for a new test, the hand lever, h, is reversed, the gearing connections and disks and pulleys being substantially similar in construction to those just described, the shaft, $s^2$, is operated in a reverse direction, and the poise, W, returned on the beam, C, for the new test.

When the specimen breaks the beam, C, will suddenly fall, this will cause the projection, $l^5$, provided on its end to depress the pivoted lever, $l^6$, and to close the valve, $e^5$, in the cylinder, L, which will then operate in the same manner as previously described when the piston rod, $l'$, is raised by the rising of the beam, C. This of course will stop the gearing operating the screw-threaded rods, 4, 4. By the falling of the beam, C in the same manner the projection, e, will close the valve, E, and stop the advance of the poise, W, as hereinbefore described, thus registering at the time the specimen broke the exact strain.

Having thus described my invention, what I claim, and desire to secure by Letters Patent, is—

1. The combination in a testing machine of a screw-threaded beam, C, having provided thereon a screw-threaded nut, N, carrying the weighing poise, W; horizontal shaft, $s^2$, journaled in bearings, j, provided with gear wheel, $s'$, adjustably keyed thereon, and gearing into gear wheel, s, secured on the nut, N; mechanism and gearing connecting said shaft, $s^2$, with a main driving shaft, means for throwing said gearing out of gear when the outer end of the beam is depressed below its neutral position and for throwing the gearing exerting the strain upon the specimen out of gear when the strain is too great in proportion to the advance of the weighing poise or when the specimen breaks substantially as described.

2. The combination in a testing machine of a screw-threaded beam, C, having provided thereon a screw-threaded nut, N, carrying the weighing poise, W, gear wheel, $s'$, gearing into gear, s, provided upon the nut, N, said gear wheel, $s'$, adjustably keyed upon the shaft, $s^2$, to allow the gear, $s'$, to slide upon said shaft as the nut, N, travels upon the beam, C, gearing connecting with the motive power for driving said shaft, $s^2$, atmospheric valve, E, communicating with the reservoir, D, and cylinder, F, through piping connections, said valve constructed to be operated by the movement of the outer end of the beam, C, piston, P, provided in cylinder, F, constructed to be operated by the valve, E, said piston, P, connected with the gearing operating the shaft, $s^2$, constructed by its operation to throw such gearing in or out of gear; valved cylinder, L, connected with the reservoir, D, and cylinder, G, by piping connections, said cylinder, L, constructed to be operated by extreme movements of the end of the beam, C; cylinder, G, provided with piston constructed to be operated by the opening or closing of valve in the cylinder, L, said piston connecting with the gearing operating upon the specimen being tested and constructed to throw such gearing in or out of gear substantially as described.

3. The combination in a testing machine of a screw-threaded beam, C, having provided thereon a screw-threaded nut, N, carrying the weighing poise, W; gear wheel, $s'$, gearing into the gear s provided upon the nut, N, said gear wheel, $s'$, adjustably keyed upon the shaft, $s^2$, to allow the gear, $s'$, to slide upon the said shaft as the nut, N, travels upon the beam, C, gearing connecting with the motive power for driving said shaft, $s^2$, atmospheric valve, E, communicating with the reservoir, D, and cylinder, F, through the piping connections, said valve constructed to be operated by the projection, e, secured to the end of the beam, C, when engaging with the lever, $e'$, pivoted to the piston of said valve, E, piston, P, provided in cylinder, F, constructed to be operated by the valve, E, said piston, P, connecting with the gearing operating the shaft, $s^2$, constructed with lever, $p'$, adapted to throw the gearing operating the nut, N, in or out of gear, cylinder, L, connected with the reservoir, D, and cylinder, G, by piping connections, said cylinder, L, constructed to be operated by hooked projection, l, and projection, $l^5$, provided on the end of the beam, C; cylinder, G, provided with piston constructed to be operated by the opening or closing of valve in the cylinder, L, said piston connected with the gearing operating upon the specimen being tested and with the gearing operating the nut, N, constructed to throw such gearing in or out of gear substantially as described.

4. The combination in a testing machine of a frame, A, uprights, 1, 1, table, 2, and crosshead, 2', vertically disposed screw-threaded rods, 4, 4, properly journaled and provided with gear wheels, 5, 5, connecting with gearing 6, 7, and 8 and driven from the main shaft, S, adjustable crosshead, 3, provided with screw-threaded orifices through which the screw-threaded vertical rods, 4, 4 pass, means for securing the specimen in the cross-head 2', and in said adjustable crosshead, 3; the table, 2, pivotally adjusted and having its bearings upon pivots, o, o', rigidly secured upon levers, B, B', said levers, B, B', having their bearings through pivoted edges, c, c, upon the supports, c', c', lever, $B^2$, having its bearing at $c^2$, connecting near said bearing with the outer end of the lever, B', by a link connection, and its outer end connected with the inner end or short arm of the screw-threaded beam, C; said screw-threaded beam, C, pivotally supported at $c^3$, screw-threaded nut, N, provided upon said beam, C, carrying the weighing poise, W, keyed shaft, $s^2$, carrying the adjustable gear wheel, $s'$, gearing into the gear wheel, s, provided upon the nut, N, the shaft, $s^2$, journaled upon the beam, C, through the medium of the journal bearings, j, gear wheels, $p^4, p^5, p^6, p^7$, and frictional pulleys, H, H', and clutch, R, projection, $e$, provided on the end of the beam, C, operating the piston of the valve, E, said valve, E, communicating with the reservoir, D, and cylinder, F, through the pipe connections, $e^2$, $e^3$, piston, P, provided in the cylinder, F, connecting with the clutch, R, and operating the same through the piston rod, $p$, and lever, $p'$, hand lever, $h$, for setting the valves of the cylinder, F; projections, $l$, $l^5$, provided on the end of the beam, C, operating respectively the arms, $l'$, $l^6$, connected with the piston of the cylinder, L, said cylinder, L, connected with the reservoir, D and cylinder, G, through the piping connections, $l^2$, $l^3$, piston provided in cylinder, G, connected with the frictional disks, $H^2$, $H^3$, through the medium of piston rod, $g'$, $g^2$, driving pulleys, $P'$, $P^2$, provided upon the shaft, S, and connected therewith through the medium of the frictional disks, $H^2$, $H^3$, said shaft, S, connecting with the gear wheel, 8, through the medium of the gear wheels 9 and 10, handle, $h'$, provided on the cylinder, G, for setting the valves provided therein, belting and connections substantially as described.

In witness whereof I have hereunto set my hand this 24th day of May, A. D. 1892.

OTTO REESER.

Witnesses:
MICHAEL F. McCULLEN,
HORACE PETTIT.